(12) United States Patent
Li et al.

(10) Patent No.: US 12,189,097 B2
(45) Date of Patent: Jan. 7, 2025

(54) OPTICAL IMAGING SYSTEM

(71) Applicant: Zhejiang Sunny Optics Co., Ltd, Yuyao (CN)

(72) Inventors: Jianlin Li, Yuyao (CN); Yang Li, Yuyao (CN); Tianxiang Xing, Yuyao (CN); Lingbo He, Yuyao (CN); Lin Huang, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 426 days.

(21) Appl. No.: 17/547,138

(22) Filed: Dec. 9, 2021

(65) Prior Publication Data

US 2022/0206273 A1 Jun. 30, 2022

(30) Foreign Application Priority Data

Dec. 29, 2020 (CN) .......................... 202011599835.5

(51) Int. Cl.
*G02B 13/00* (2006.01)
*G02B 9/64* (2006.01)

(52) U.S. Cl.
CPC ........... *G02B 13/0065* (2013.01); *G02B 9/64* (2013.01); *G02B 13/0045* (2013.01)

(58) Field of Classification Search
CPC ... G02B 13/0065; G02B 9/64; G02B 13/0045
USPC ........................................................ 359/755
See application file for complete search history.

(56) References Cited

U.S. PATENT DOCUMENTS

| | | | | |
|---|---|---|---|---|
| 2019/0331897 A1* | 10/2019 | Lee | .................. | G02B 13/0045 |
| 2021/0157096 A1* | 5/2021 | Hirano | .................. | H04N 23/55 |
| 2021/0223515 A1* | 7/2021 | Tseng | ................. | G02B 27/0025 |
| 2022/0035135 A1* | 2/2022 | Wang | ....................... | G02B 9/64 |
| 2023/0070553 A1* | 3/2023 | Chen | .................... | G02B 13/18 |

FOREIGN PATENT DOCUMENTS

| | | | | |
|---|---|---|---|---|
| CN | 110542996 A | | 12/2019 | |
| CN | 211086762 U | | 7/2020 | |
| CN | 111552059 A | | 8/2020 | |
| CN | 211603690 U | * | 9/2020 | ......... G02B 13/0045 |
| CN | 112130293 A | | 12/2020 | |
| TW | I736377 B | * | 8/2021 | ......... G02B 13/0045 |

OTHER PUBLICATIONS

First Examination Report for application 202114057415, dated May 11, 2022, 5 pages.

* cited by examiner

*Primary Examiner* — George G. King
(74) *Attorney, Agent, or Firm* — Barnes & Thornburg LLP

(57) ABSTRACT

Embodiments of the present disclosure disclose an optical imaging system, comprising, sequentially from an object side to an image side along an optical axis: a prism, reflecting light incident to the prism along a first direction, to cause the light to emerge from the prism along a second direction, and a stop, a first lens, a second lens, a third lens, a fourth lens, a fifth lens, a sixth lens, and a seventh lens sequentially from the prism to an image side along the second direction, each of the first lens to the seventh lens has a refractive power. A total effective focal length f of the optical imaging system and an entrance pupil diameter EPD of the optical imaging system satisfy: f/EPD<1.4.

18 Claims, 8 Drawing Sheets

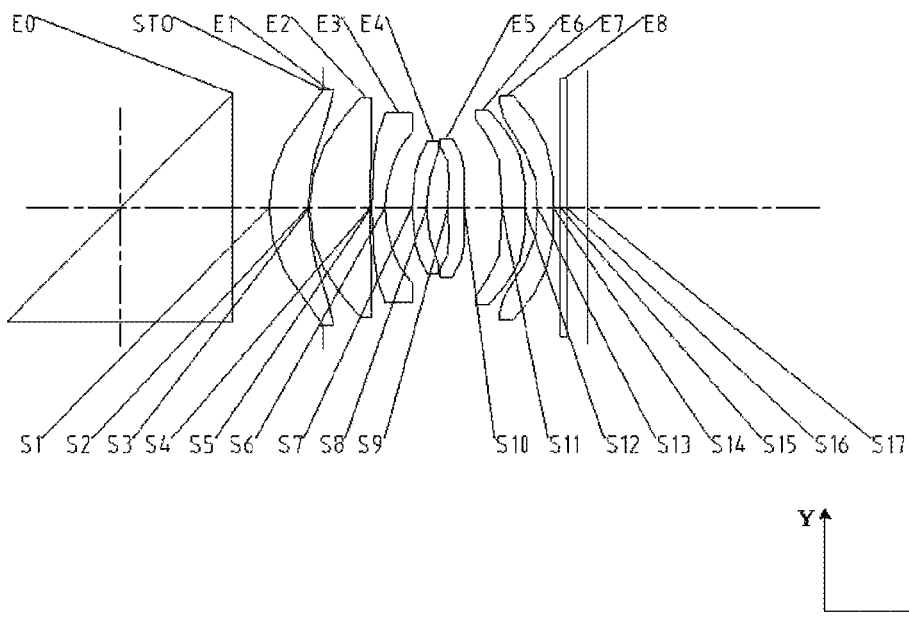
Fig. 1
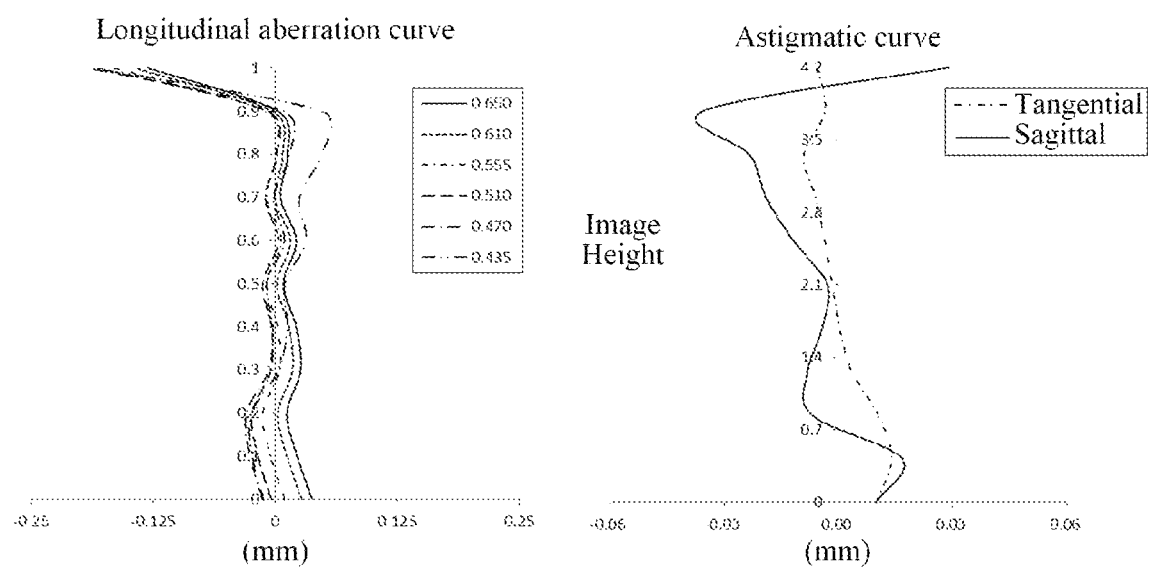
Fig. 2A                    Fig. 2B

OPTICAL IMAGING SYSTEM

CROSS-REFERENCE TO RELATED APPLICATIONS

This application claims the priority from Chinese Patent Application No. 202011599835.5, filed in the National Intellectual Property Administration (CNIPA) on Dec. 29, 2020, the contents of which are hereby incorporated by reference in their entirety.

TECHNICAL FIELD

The present disclosure relates to the field of optical element, and particularly to an optical imaging system.

BACKGROUND

At present, optical imaging systems applied to portable electronic products such as smart phones mainly adopt digital zoom and low-power optical zoom technologies in order to have a zoom function. However, due to the limitation of the thickness of portable electronic products such as mobile phones, the horizontally placed optical imaging system can only have a small focal length, and the optical zoom capability is limited.

At the same time, with the development of the industry, most lens manufacturers have gradually adopted the periscope structure for zooming. This structure is different from the side-by-side arrangement of traditional dual-camera lenses. It adjusts the camera originally placed in a vertical row to be horizontally arranged inside the mobile phone, uses a special optical prism to refract light into the lens group to achieve an imaging effect, and significantly increases the focal length of the camera in turn. However, the addition of prisms will adversely affect the imaging quality of the optical imaging system.

SUMMARY

An aspect of the present disclosure is to provide an optical imaging system, which comprises: a prism, reflecting light incident to the prism along a first direction, to cause the light to emerge from the prism along a second direction; and further comprises, sequentially from the prism to an image side along the second direction: a stop, a first lens, a second lens, a third lens, a fourth lens, a fifth lens, a sixth lens, and a seventh lens, wherein each of the first lens to the seventh lens has a refractive power. A total effective focal length f of the optical imaging system and an entrance pupil diameter EPD of the optical imaging system may satisfy: f/EPD<1.4.

According to an implementation of the present disclosure, at least one of the surfaces from the object-side surface of the first lens to the image-side surface of the seventh lens is an aspheric surface.

According to an implementation of the present disclosure, an effective focal length f1 of the first lens, an effective focal length f3 of the third lens, and an effective focal length f7 of the seventh lens may satisfy: −1.5<(f1+f7)/f3<0.

According to an implementation of the present disclosure, an effective focal length f2 of the second lens and the total effective focal length f of the optical imaging system may satisfy: 0.6<f2/f<1.

According to an implementation of the present disclosure, a radius of curvature R1 of an object-side surface of the first lens, a radius of curvature R2 of an image-side surface of the first lens, and a radius of curvature R3 of an object-side surface of the second lens may satisfy: 0.2<R3/(R1+R2)<0.5.

According to an implementation of the present disclosure, a center thickness CT1 of the first lens on an optical axis and a center thickness CT2 of the second lens on the optical axis may satisfy: 0.4<CT1/CT2<1.1.

According to an implementation of the present disclosure, a center thickness CT4 of the fourth lens on an optical axis, a center thickness CT5 of the fifth lens on the optical axis, and a spacing distance T45 between the fourth lens and the fifth lens on the optical axis may satisfy: 1.4<(CT4+CT5)/T45<2.6.

According to an implementation of the present disclosure, a radius of curvature R7 of an object-side surface of the fourth lens, a radius of curvature R8 of an image-side surface of the fourth lens, and the total effective focal length f of the optical imaging system may satisfy: 0.8<(R7+R8)/f<1.3.

According to an implementation of the present disclosure, a distance TTL from an object-side surface of the first lens to an image plane of the optical imaging system on an optical axis and the total effective focal length f of the optical imaging system may satisfy: TTL/f≤1.15.

According to an implementation of the present disclosure, half of a maximal field-of-view Semi-FOV of the optical imaging system may satisfy: 20°<Semi-FOV<30°.

According to an implementation of the present disclosure, the second lens has a positive refractive power; an object-side surface of the fourth lens is a convex surface, an image-side surface of the fourth lens is a concave surface; and an image-side surface of the sixth lens is a concave surface.

Another aspect of the present disclosure is to provide an optical imaging system, which comprises, sequentially from an object side to an image side along an optical axis: a prism, reflecting light incident to the prism along a first direction, to cause the light to emerge from the prism along a second direction; and further comprises, sequentially from the prism to an image side along the second direction: a stop, a first lens, a second lens, a third lens, a fourth lens, a fifth lens, a sixth lens, and a seventh lens, wherein the second lens has a positive refractive power; an object-side surface of the fourth lens is a convex surface, an image-side surface of the fourth lens is a concave surface; and an image-side surface of the sixth lens is a concave surface.

According to an implementation of the present disclosure, an effective focal length f2 of the second lens and a total effective focal length f of the optical imaging system may satisfy: 0.6<f2/f<1.

According to an implementation of the present disclosure, a radius of curvature R1 of an object-side surface of the first lens, a radius of curvature R2 of an image-side surface of the first lens, and a radius of curvature R3 of an object-side surface of the second lens may satisfy: 0.2<R3/(R1+R2)<0.5.

According to an implementation of the present disclosure, a center thickness CT1 of the first lens on an optical axis and a center thickness CT2 of the second lens on the optical axis may satisfy: 0.4<CT1/CT2<1.1.

According to an implementation of the present disclosure, a center thickness CT4 of the fourth lens on an optical axis, a center thickness CT5 of the fifth lens on the optical axis, and a spacing distance T45 between the fourth lens and the fifth lens on the optical axis may satisfy: 1.4<(CT4+CT5)/T45<2.6.

According to an implementation of the present disclosure, a radius of curvature R7 of the object-side surface of the fourth lens, a radius of curvature R8 of the image-side surface of the fourth lens, and a total effective focal length f of the optical imaging system may satisfy: $0.8<(R7+R8)/f<1.3$.

According to an implementation of the present disclosure, an effective focal length f1 of the first lens, an effective focal length f3 of the third lens, and an effective focal length f7 of the seventh lens may satisfy: $-1.5<(f1+f7)/f3<0$.

According to an implementation of the present disclosure, a distance TTL from an object-side surface of the first lens to an image plane of the optical imaging system on an optical axis and a total effective focal length f of the optical imaging system may satisfy: $TTL/f \leq 4.15$.

According to an implementation of the present disclosure, half of a maximal field-of-view Semi-FOV of the optical imaging system may satisfy: $20°<Semi\text{-}FOV<30°$.

According to an implementation of the present disclosure, a total effective focal length f of the optical imaging system and an entrance pupil diameter EPD of the optical imaging system may satisfy: $f/EPD<1.4$.

According to implementations of the present disclosure, by reasonably distributing the refractive powers and surface types of the lenses and optimizing optical parameters, an optical imaging system applicable to a portable electronic product and having characteristics of large stop, miniaturization and good imaging quality is provided.

BRIEF DESCRIPTION OF THE DRAWINGS

After reading detailed descriptions of non-limiting embodiments given with reference to the following accompanying drawings, other features, objectives and advantages of the present disclosure will become more apparent:

FIG. 1 is a schematic structural diagram of an optical imaging system according to Embodiment 1 of the present disclosure;

FIGS. 2A to 2D respectively show a longitudinal aberration curve, an astigmatic curve, a distortion curve and a lateral color curve of the optical imaging system according to Embodiment 1 of the present disclosure;

DETAILED DESCRIPTION OF EMBODIMENTS

Figure 2C:
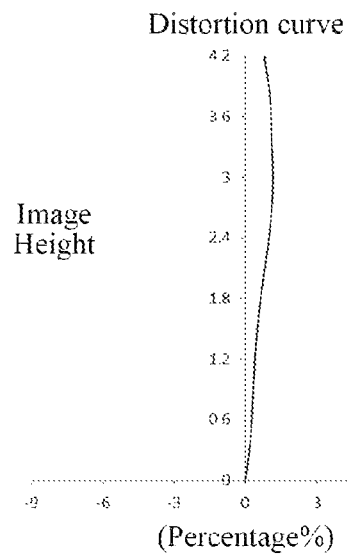

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of" when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging system according to exemplary implementations of the present disclosure may include a prism and seven lenses having refractive powers. The seven lenses having refractive powers are respectively a first lens, a second lens, a third lens, a fourth lens, a fifth lens, a sixth lens and a seventh lens. As shown in FIG. 1 the light is incident into the prism along a first direction Y, the prism reflects the light to cause the light to emerge from the prism along a second direction X. Here, the first direction Y may be perpendicular to the second direction X. The seven lenses are arranged sequentially from the prism to an image side along the second direction. Any two adjacent lenses in the first to seventh lenses may have a spacing distance.

In exemplary implementations, the optical imaging system may satisfy: f/EPD<1.4. Here, f is the total effective focal length of the optical imaging system, and EPD is an entrance pupil diameter of the optical imaging system. By satisfying f/EPD<1.4, the optical imaging system's ability of collecting light can be efficiently controlled. That is, in the case of the same focal length, the smaller the F-number Fno is, the larger amount of light collected by the optical imaging system is, which is conducive to reducing the power consumption of the system and improving the illuminance on the imaging surface.

In exemplary implementations, the optical imaging system may satisfy: −1.5<(f1+f7)/f3<0. Here, f1 is an effective focal length of the first lens, f3 is an effective focal length of the third lens, and f7 is an effective focal length of the seventh lens. More particularly, f1, f3 and f7 may further satisfy: −1.3<(f1+f7)/f3<0.4. Satisfying −1.5<(f1+f7)/f3<0 is conducive to effectively correcting the chromatic aberration of the optical imaging system, and improving the imaging quality of the optical imaging system.

In exemplary implementations, the optical imaging system may satisfy: 0.6<f2/f<1. Here, f2 is the effective focal length of the second lens, and f is the total effective focal length of the optical imaging system. More particularly, f2 and f may further satisfy: 0.7<f2/f<1. Satisfying 0.6<f2/f<1 is conducive to obtaining larger object-side field of view, to correcting the off-axis aberration of the lens group, and to improving the imaging quality of the optical imaging system.

In exemplary implementations, the optical imaging system may satisfy: 0.2<R3/(R1+R2)<0.5, Here, R1 is a radius of curvature of an object-side surface of the first lens. R2 is a radius of curvature of an image-side surface of the first lens, and R3 is a radius of curvature of an object-side surface of the second lens. More particularly, R1, R2 and R3 may further satisfy: 0.3<R3/(R1+R2)<0.5. By satisfying 0.2<R3/(R1+R2)<0.5, the off-axis aberration of the optical imaging system can be effectively corrected, and the distortion of the optical imaging system can be reduced.

In exemplary implementations, the optical imaging system may satisfy: 0.4<CT1/CT2<1.1 Here, CT1 is a center thickness of the first lens on the optical axis, and CT2 is a center thickness of the second lens on the optical axis. Satisfying 0.4<CT1/CT2<1.1 is conducive to ensuring the injection molding of the first lens and the second lens and improving the imaging quality and processability of the imaging system.

In exemplary implementations, the optical imaging system may satisfy: 1.4<(CT4+CT5)/T45<2.6. Here, CT4 is a center thickness of the fourth lens on the optical axis, CT5 is a center thickness of the fifth lens on the optical axis, and T45 is a spacing distance between the fourth lens and the fifth lens on the optical axis. Satisfying 1.4<(CT4+CT5)/T45<2.6 may effectively reduce the thickness sensitivity of the system and help to correct field curvature.

In exemplary implementations, the optical imaging system may satisfy: 0.8<(R7+R8)/f<1.3. Here, R7 is a radius of curvature of an object-side surface of the fourth lens, R8 is a radius of curvature of the image-side surface of the fourth lens, and f is the total effective focal length of the optical imaging system. More particularly, R7, R8 and f may further satisfy: 0.9<(R7+R8)/f<1.2. Satisfying 0.8<(R7+R8)/f<1.3 is conducive to eliminating the spherical aberrations of the optical imaging system and ensuring the imaging quality of the optical system.

In exemplary implementations, the optical imaging system may satisfy: TTL/f≤1.15. Here, TTL is a distance from the object-side surface of the first lens to the image plane of the optical imaging system on an optical axis, and f is the total effective focal length of the optical imaging system. Satisfying TTL/f≤1.15 can ensure that the focal length of the optical imaging system and the total track length of the lens assembly are within a reasonable range, which is beneficial to the optical imaging system to have the characteristics of small depth of field, high magnification, miniaturization and the like.

In exemplary implementations, the optical imaging system may satisfy: 20°<Semi-FOV<30°. Here, Semi-FOV is half of a maximal field-of-view of the optical imaging system. More particularly, Semi-FOV may further satisfy: 23°<Semi-FOV-28°. Satisfying 20°<Semi-FOV-30° is conducive to imaging a larger range of object information on a chip.

In exemplary implementations, the second lens may have a positive refractive power; the object-side surface of the fourth lens may be a convex surface, the image-side surface of the fourth lens may be a concave surface; and an image-side surface of the sixth lens may be a concave surface. By reasonably matching the optical power and surface type characteristics of the fourth lens, the machinability of the fourth lens can be ensured, which is conducive to reducing the chromatic aberration of the optical imaging system and improving the imaging quality of the optical imaging system. By reasonably matching the refractive power and surface type characteristics of the sixth lens, it is conducive to correcting the off-axis aberration of the lens group, improving the imaging quality, and effectively reducing the tolerance sensitivity of the optical imaging system.

In exemplary implementations, the optical imaging system may further include a stop disposed between the prism and the first lens. Alternatively, the above optical imaging system may further include an optical filter for correcting color deviations and/or a protective glass for protecting a photosensitive element on the image plane. Implementations of the present disclosure propose an optical imaging system having characteristics such as miniaturization, large stop and high imaging quality. The optical imaging system according to the above implementations of the present disclosure may use a plurality of lenses, for example, the above seven lenses. By reasonably distributing the refractive powers and the surface types of the lenses, the center thicknesses of the lenses, the axial spacings between the lenses, etc., it is possible to effectively converge the incident light, reduce the total track length of an imaging lens assembly, and improve the processability of the imaging lens assembly, which is more conducive to the production and processing of the optical imaging system.

In implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, both the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging system without departing from the technical solution claimed by the present disclosure. For example, although the optical imaging system having seven lenses is described as an example in the implementations, the optical imaging system is not limited to the seven lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1 to 2D. FIG. 1 is a schematic structural diagram of the optical imaging system according to Embodiment 1 of the present disclosure.

As shown in FIG. 1, the optical imaging system includes, sequentially from an object side to an image side along a second direction, a prism E0, a stop STO, a first lens E1, a second lens E2, a third lens E3, a fourth lens E4, a fifth lens E5, a sixth lens E6, a seventh lens E7, an optical filter E8 and an image plane S17.

The prism E0 has a light incident surface, a light reflection surface and a light emergent surface. The first lens E1 has a positive refractive power, an object-side surface S1 of the first lens E1 is a convex surface, and an image-side surface S2 of the first lens E is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S1 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens EC is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface SIS and an image-side surface S16. Light from an object sequentially passes through the surfaces from the light incident surface of the prism EU to the image-side surface S16 of the optical filter E8, and finally forms an image on the image plane S17.

Table 1 is a table showing basic parameters of the optical imaging system in Embodiment 1. Here, the units of a radius of curvature, a thickness/distance and a focal length are millimeters (mm).

TABLE 1

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
|  | spherical | infinite | 3.4000 | 1.91 | 31.32 | | |
|  | spherical | infinite | 3.4000 | 1.91 | 31.32 | | |
|  | spherical | infinite | 2.3932 | | | | |
| STO | spherical | infinite | −1.6392 | | | | |
| S1 | aspheric | 4.0765 | 1.2327 | 1.55 | 55.82 | 19.95 | −0.3736 |
| S2 | aspheric | 5.8199 | 0.0400 | | | | 0.0392 |
| S3 | aspheric | 3.8926 | 1.9150 | 1.55 | 55.82 | 7.65 | 0.0.346 |
| S4 | aspheric | 47.6995 | 0.0300 | | | | 86.1187 |
| S5 | aspheric | 8.5106 | 0.4317 | 1.68 | 19.24 | −9.29 | 3.2943 |
| S6 | aspheric | 3.5451 | 0.8346 | | | | 0.0051 |
| S7 | aspheric | 4.8693 | 0.4700 | 1.55 | 55.82 | −62.74 | −0.3948 |
| S8 | aspheric | 4.1178 | 0.6711 | | | | 0.2844 |
| S9 | aspheric | 9.2932 | 0.5135 | 1.68 | 19.24 | 29.14 | −94.8057 |
| S10 | aspheric | 17.1630 | 1.1787 | | | | −85.1723 |
| S11 | aspheric | −1705.3216 | 0.7128 | 1.68 | 19.24 | −236.33 | 39.0000 |
| S12 | aspheric | 176.7439 | 0.3951 | | | | −99.0000 |
| S13 | aspheric | −23.6601 | 0.5000 | 1.55 | 55.82 | −13.48 | 46.3954 |

TABLE 1-continued

| surface number | surface type | radius of curvature | Thickness/ distance | material refractive index | abbe number | focal length | conic coefficient |
|---|---|---|---|---|---|---|---|
| S14 | aspheric | 10.7648 | 0.2203 | | | | 1.7088 |
| S15 | spherical | infinite | 0.2100 | 1.52 | 64.17 | | |
| S16 | spherical | infinite | 0.6344 | | | | |
| S17 | spherical | infinite | infinite | | | | |

In this embodiment, a total effective focal length f of the optical imaging system is 9.50 mm, and a distance TTL from the object-side surface S1 of the first lens E1 to the image plane S17 of the optical imaging system on an optical axis is 9.99 mm. Half of a diagonal length ImgH of an effective pixel area on the image plane S17 of the optical imaging system is 4.20 mm. Half of a maximal field-of-view Semi-FOV of the optical imaging system is 23.7°. A ratio the total effective focal length f of the optical imaging system to an entrance pupil diameter EPD of the optical imaging system f/EPD is 1.30.

In Embodiment 1, both the object-side surface and the image-side surface of any lens in the first to seventh lenses E1 to E7 are aspheric surfaces, and the surface type x of each aspheric lens may be defined using, but not limited to, the following formula:

$$x = \frac{ch^2}{1+\sqrt{1-(k+1)c^2h^2}} + \sum A_i h^i. \quad (1)$$

Here, x is the sag the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Tables 2-1 and 2-2 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S14 in Embodiment 1.

TABLE 2-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −1.0443E−01 | −9.6776E−02 | −3.2939E−02 | −5.5887E−03 | 1.5087E−03 | 1.0436E−03 | 2.3678E−04 |
| S2 | −4.1256E−01 | −5.9932E−02 | −2.2083E−02 | 6.8601E−03 | 2.4173E−03 | −1.6133E−03 | 5.4986E−04 |
| S3 | −3.5511E−01 | −6.4788E−02 | −4.6239E−02 | −7.2593E−03 | 2.6602E−03 | 1.2464E−03 | 2.2854E−03 |
| S4 | −9.7272E−02 | 8.4074E−03 | −2.0706E−02 | 1.0846E−02 | 2.6359E−04 | 1.7489E−03 | 2.1492E−04 |
| S5 | −2.6081E−01 | 8.9918E−02 | −8.1522E−03 | 7.6177E−03 | −5.9665E−05 | 1.2415E−03 | 1.6502E−04 |
| S6 | −8.8161E−02 | 3.5400E−02 | 3.3114E−03 | −5.1458E−05 | −1.1036E−03 | −2.9261E−04 | −7.1033E−05 |
| S7 | −6.7870E−02 | 3.0984E−02 | 7.5850E−03 | 2.7936E−03 | 4.0346E−04 | 1.4955E−04 | 7.3063E−05 |
| S8 | −6.5790E−02 | 1.5925E−02 | 1.3602E−03 | 1.3225E−03 | 1.9928E−04 | 1.1134E−04 | 1.6752E−05 |
| S9 | −3.0031E−01 | −3.4212E−02 | −8.5257E−04 | 1.4163E−04 | 3.6642E−04 | −1.1600E−05 | −1.2567E−05 |
| S10 | −4.9014E−01 | −3.9956E−03 | 9.4787E−03 | 3.4541E−03 | 2.6766E−04 | −3.0509E−04 | −2.5292E−04 |
| S11 | −9.8096E−01 | 9.7645E−02 | 5.2743E−02 | 5.6556E−03 | −2.2296E−03 | 1.8659E−03 | 4.2207E−06 |
| S12 | −1.3191E+00 | 1.4652E−01 | 1.6408E−02 | 9.0473E−03 | −2.2941E−03 | 2.4216E−03 | 1.1844E−03 |
| S13 | −1.2891E+00 | 5.3722E−01 | −1.0902E−01 | 4.5730E−02 | −2.4584E−02 | −9.3574E−04 | −9.4251E−04 |
| S14 | −2.1658E+00 | 3.9218E−01 | −9.7415E−02 | 6.9405E−02 | −1.7425E−02 | −2.2139E−03 | −6.3262E−03 |

TABLE 2-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.9782E−05 | −5.1606E−05 | 3.4676E−05 | 1.1694E−05 | 0.0000E+00 | 0.0000E+00 | 0.0000E+00 |
| S2 | −2.8845E−04 | 9.7600E−05 | 1.0469E−04 | −5.5155E−05 | 0.0000E+00 | 0.0000E+00 | 0.0000E+00 |
| S3 | 7.4319E−04 | 4.0116E−04 | 3.8560E−05 | −3.9207E−06 | 0.0000E+00 | 0.0000E+00 | 0.0000E+00 |
| S4 | 1.6442E−04 | 1.5119E−04 | −5.6282E−05 | −4.0086E−05 | 0.0000E+00 | 0.0000E+00 | 0.0000E+00 |
| S5 | −3.1567E−05 | 2.9746E−05 | 0.0000E+00 | 0.0000E+00 | 0.0000E+00 | 0.0000E+00 | 0.0000E+00 |
| S6 | −9.0913E−06 | −1.2256E−05 | 0.0000E+00 | 0.0000E+00 | 0.0000E+00 | 0.0000E+00 | 0.0000E+00 |
| S7 | 2.1339E−05 | 1.3229E−05 | 4.6910E−06 | 5.0517E−06 | 0.0000E+00 | 0.0000E+00 | 0.0000E+00 |
| S8 | 1.9873E−05 | −4.1190E−06 | −4.6145E−06 | 3.1929E−06 | 0.0000E+00 | 0.0000E+00 | 0.0000E+00 |
| S9 | −4.6239E−05 | −1.8350E−05 | 1.7683E−05 | 4.0576E−06 | 3.8723E−06 | 0.0000E+00 | 0.0000E+00 |
| S10 | −1.3526E−04 | −5.0475E−05 | 2.3312E−05 | 1.1135E−05 | 8.0755E−06 | 0.0000E+00 | 0.0000E+00 |
| S11 | −1.0034E−03 | −5.4652E−04 | 2.5804E−04 | 1.5618E−04 | 2.1400E−05 | −2.1932E−05 | 4.8833E−05 |
| S12 | −2.8548E−04 | −6.7859E−04 | 6.3906E−04 | 7.7438E−04 | 2.0694E−04 | −1.7997E−04 | −5.5840E−05 |
| S13 | 1.3133E−04 | −3.7599E−04 | 1.2525E−03 | −3.8449E−04 | −3.4009E−04 | −7.8388E−05 | 4.0903E−04 |
| S14 | −1.6194E−03 | −1.5418E−03 | 5.3223E−04 | 1.9520E−04 | 5.7227E−04 | 7.4545E−05 | 1.2603E−04 |

Figure 2D:
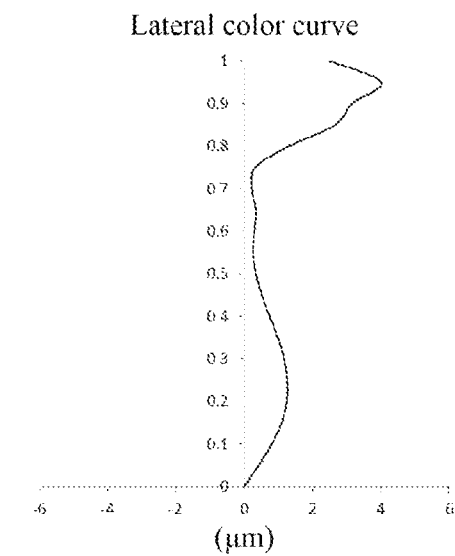

FIG. 2A illustrates a longitudinal aberration curve of the optical imaging system in Embodiment 1, representing deviations of focal points of light of different wavelengths converged after passing through a lens assembly. FIG. 2B illustrates an astigmatic curve of the optical imaging system in Embodiment 1, representing a curvature of a tangential image plane and a curvature of a sagittal image plane. FIG. 2C illustrates a distortion curve of the optical imaging system in Embodiment 1, representing amounts of distortion corresponding to different image heights. FIG. 2D illustrates a lateral color curve of the optical imaging system in Embodiment 1, representing deviations of different image heights on the image plane after light passes through the lens assembly. It can be seen from FIGS. 2A to 2D that the optical imaging system given in Embodiment 1 can achieve a good imaging quality.

Embodiment 2

Figure 3:
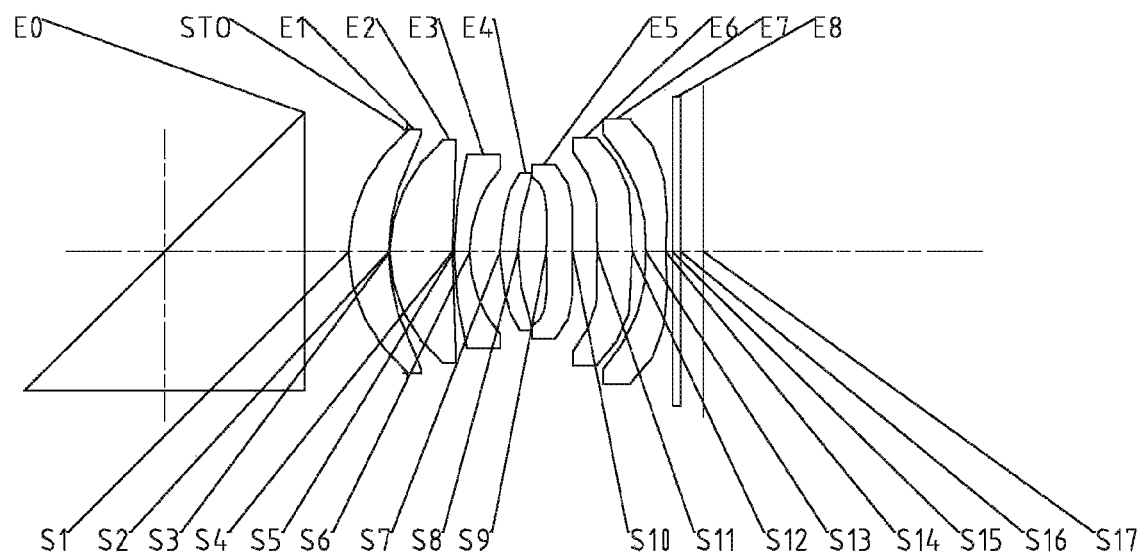
FIG. 3 is a schematic structural diagram of an optical imaging system according to Embodiment 2 of the present disclosure.

An optical imaging system according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the optical imaging system according to Embodiment 2 of the present disclosure.

As shown in FIG. 3, the optical imaging system includes, sequentially from an object side to an image side, a prism E0, a stop STO, a first lens E1, a second lens E2, third lens E3, a fourth lens E4, a fifth lens E5, a sixth lens E6, a seventh lens E7, an optical filter E8 and an image plane S17.

The prism E0 has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism E0 to the image-side surface S16 of the optical filter E8, and finally forms an image on the image plane S17.

In this embodiment, a total effective focal length f of the optical imaging system is 8.02 mm, and a distance TTL from the object-side surface S1 of the first lens E1 to the image plane S17 of the optical imaging system on an optical axis is 8.99 mm. Half of a diagonal length ImgH of an effective pixel area on the image plane S17 of the optical imaging system is 4.20 mm. Half of a maximal field-of-view Semi-FOV of the optical imaging system is 25.96°. A ratio the total effective focal length f of the optical imaging system to an entrance pupil diameter EPD of the optical imaging system f/EPD is 1.30.

Table 3 is a table showing basic parameters of the optical imaging system in Embodiment 2. Here, the units of a radius of curvature, a thickness/distance and a focal length are millimeters (mm). Tables 4-1 and 4-2 show the high-order coefficients applicable to the aspheric surfaces in Embodiment 2. Here, the surface type of each

TABLE 3

| surface number | surface type | radius of curvature | Thickness/ distance | refractive index | abbe number | focal length | conic coefficient |
|---|---|---|---|---|---|---|---|
| OBJ | spherical | infinite | infinite | | | | |
| | spherical | infinite | 3.4000 | 1.91 | 31.32 | | |
| | spherical | infinite | 3.4000 | 1.91 | 31.32 | | |
| | spherical | infinite | 2.3932 | | | | |
| STO | spherical | infinite | −1.6392 | | | | |
| S1 | aspheric | 3.7724 | 1.0200 | 1.55 | 55.82 | 20.05 | −0.3289 |
| S2 | aspheric | 5.2063 | 0.0200 | | | | 0.1007 |
| S3 | aspheric | 3.3999 | 1.5898 | 1.55 | 55.82 | 6.87 | 0.0000 |
| S4 | aspheric | 30.3478 | 0.0390 | | | | 0.0000 |
| S5 | aspheric | 7.0912 | 0.4000 | 1.68 | 19.24 | −8.89 | 2.8594 |
| S6 | aspheric | 3.1826 | 0.7588 | | | | 0.1062 |
| S7 | aspheric | 4.2082 | 0.4600 | 1.55 | 55.82 | 121.52 | −0.7778 |
| S8 | aspheric | 4.3198 | 0.7213 | | | | −0.4182 |
| S9 | aspheric | 17.3459 | 0.6691 | 1.68 | 19.24 | 78.34 | −35.8063 |
| S10 | aspheric | 25.3646 | 0.6191 | | | | 79.1979 |
| S11 | aspheric | 20.8095 | 0.8877 | 1.68 | 19.24 | 31.11 | 39.0000 |
| S12 | aspheric | 1596.8221 | 0.3464 | | | | 90.0000 |
| S13 | aspheric | −27.4634 | 0.5040 | 1.55 | 55.82 | −9.22 | 46.3954 |
| S14 | aspheric | 6.2030 | 0.1664 | | | | 2.0600 |
| S15 | spherical | infinite | 0.2100 | 1.52 | 64.17 | | |
| S16 | spherical | infinite | 0.5819 | | | | |
| S17 | spherical | infinite | infinite | | | | |

TABLE 4-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 4.0986E−02 | −6.4058E−03 | −3.0419E−03 | −1.4080E−03 | −3.4102E−04 | −1.6544E−04 | −4.9831E−05 |
| S2 | −1.3821E−01 | 1.3325E−02 | −8.3425E−03 | −4.9559E−04 | 1.3163E−04 | −5.2471E−04 | 2.6156E−04 |
| S3 | −1.7192E−01 | 2.4401E−03 | −8.9654E−03 | −1.7941E−03 | −1.2298E−04 | −5.8175E−04 | 1.5209E−04 |
| S4 | −5.0025E−02 | 2.3167E−02 | −7.9156E−03 | 2.6027E−03 | −9.9282E−04 | 3.0338E−04 | −8.1987E−05 |
| S5 | −2.0703E−01 | 4.2159E−02 | −1.0066E−02 | 2.7744E−03 | −8.5983E−04 | 1.9541E−04 | −3.0844E−05 |
| S6 | −6.5846E−02 | 2.3321E−02 | −1.8510E−03 | 3.1657E−03 | −3.1569E−04 | −7.3843E−05 | −1.7446E−05 |
| S7 | −3.9252E−02 | 2.7623E−02 | 9.5006E−03 | 3.0688E−03 | 1.1620E−03 | 4.2191E−04 | 2.5758E−04 |
| S8 | −8.8649E−02 | 6.2964E−03 | 2.8735E−03 | 8.5351E−04 | 4.0780E−04 | 6.7250E−05 | 9.3948E−05 |
| S9 | −3.2713E−01 | −5.1990E−02 | −1.3290E−02 | −3.3173E−03 | −1.0485E−03 | −2.4876E−04 | −6.7969E−05 |
| S10 | −5.3084E−01 | −2.3865E−02 | 4.9590E−03 | 3.6843E−03 | 1.7003E−03 | 7.5407E−04 | 4.6193E−04 |
| S11 | −8.5868E−01 | 4.2288E−02 | 3.4006E−02 | −3.4051E−04 | −7.3070E−04 | 1.4030E−03 | 9.1780E−04 |
| S12 | −9.4708E−01 | 4.3889E−02 | 1.1642E−02 | −9.7840E−03 | 2.7734E−03 | 6.8855E−04 | 1.4875E−03 |
| S13 | −1.0510E+00 | 2.0674E−01 | −6.4191E−02 | 2.7489E−02 | 4.4906E−03 | −3.0783E−03 | −4.1555E−04 |
| S14 | −2.3939E+00 | 1.7989E−01 | −1.0914E−01 | 4.5038E−02 | −1.8074E−03 | 1.8538E−04 | −2.1519E−03 |

TABLE 4-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 2.5666E−05 | 1.0322E−05 | 1.2609E−06 | −1.0815E−06 | 0.0000E+00 | 0.0000E+00 | 0.0000E+00 |
| S2 | −6.6816E−05 | 3.3757E−05 | −9.9653E−06 | 9.2233E−07 | 0.0000E+00 | 0.0000E+00 | 0.0000E+00 |
| S3 | −5.3349E−05 | 1.8756E−05 | −1.0484E−06 | −3.1144E−07 | 2.3701E−08 | −2.2701E−08 | 0.0000E+00 |
| S4 | 2.0439E−05 | −3.7068E−06 | 3.8671E−07 | −1.7022E−08 | 0.0000E+00 | 0.0000E+00 | 0.0000E+00 |
| S5 | −8.8870E−06 | 7.8459E−06 | 0.0000E+00 | 0.0000E+00 | 0.0000E+00 | 0.0000E+00 | 0.0000E+00 |
| S6 | −2.0091E−05 | −7.1225E−06 | 0.0000E+00 | 0.0000E+00 | 0.0000E+00 | 0.0000E+00 | 0.0000E+00 |
| S7 | 9.8502E−05 | 7.1946E−05 | 2.2705E−05 | 1.6534E−05 | 0.0000E+00 | 0.0000E+00 | 0.0000E+00 |
| S8 | 4.2655E−06 | 2.7214E−05 | 5.7233E−07 | 9.6167E−06 | 0.0000E+00 | 0.0000E+00 | 0.0000E+00 |
| S9 | 2.4837E−05 | −5.6219E−06 | 1.9890E−05 | −3.1215E−06 | 1.2328E−05 | 0.0000E+00 | 0.0000E+00 |
| S10 | 1.4764E−04 | 5.3876E−05 | 3.8103E−06 | 7.9123E−07 | −1.0787E−06 | 0.0000E+00 | 0.0000E+00 |
| S11 | −5.4702E−05 | −3.5294E−04 | −1.0640E−04 | −5.2125E−07 | 2.1987E−05 | −1.3931E−05 | 2.2935E−05 |
| S12 | 2.0163E−03 | 8.2580E−04 | −2.6683E−05 | −8.6046E−05 | −4.2127E−05 | −1.6456E−05 | 7.5555E−06 |
| S13 | 2.7748E−03 | 9.2747E−04 | −2.7235E−04 | −3.3161E−04 | −2.3017E−04 | 2.1043E−06 | 7.0300E−05 |
| S14 | 1.4953E−04 | −1.5958E−04 | 4.4255E−04 | 1.1053E−04 | −4.0702E−05 | −5.2904E−06 | −5.7401E−06 |

Figure 4A:
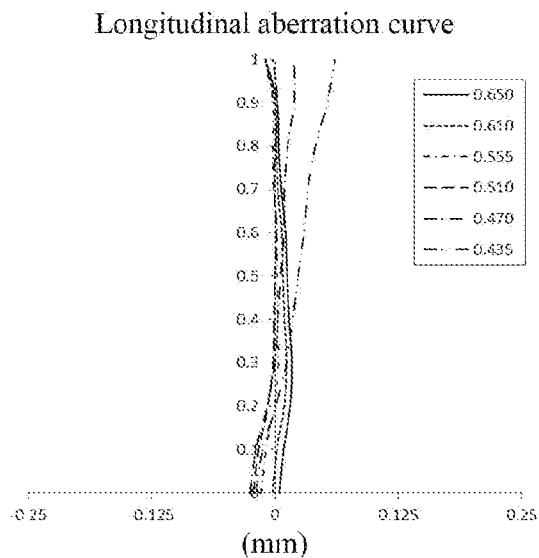
FIGS. 4A to 4D respectively show a longitudinal aberration curve, an astigmatic curve, a distortion curve and a lateral color curve of the optical imaging system according to Embodiment 2 of the present disclosure.
Figure 4B:
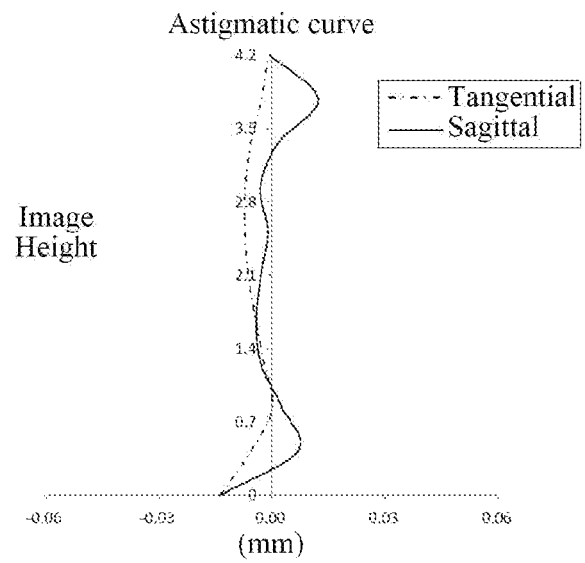
Figure 4C:
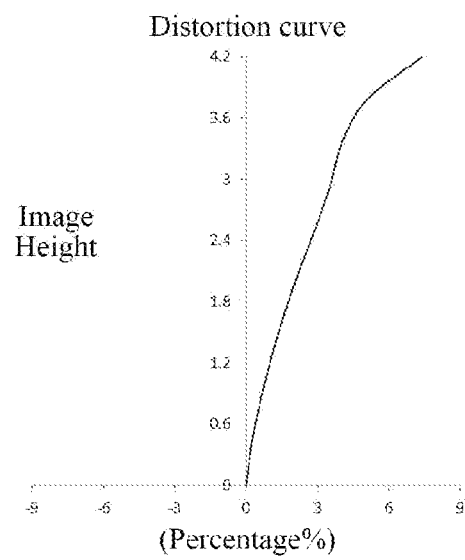
Figure 4D:
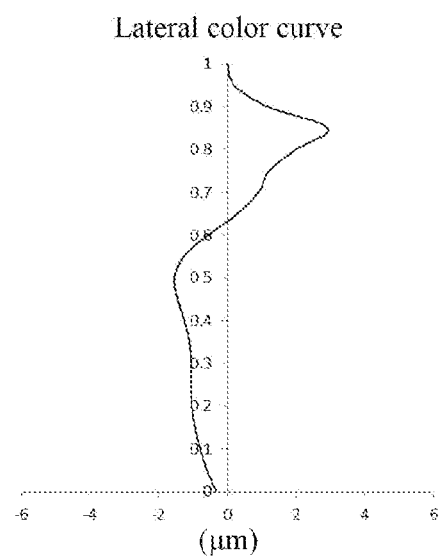

FIG. 4A illustrates a longitudinal aberration curve of the optical imaging system in Embodiment 2, representing deviations of focal points of light of different wavelengths converged after passing through a lens assembly. FIG. 4B illustrates an astigmatic curve of the optical imaging system in Embodiment 2, representing a curvature of a tangential image plane and a curvature of a sagittal image plane. FIG. 4C illustrates a distortion curve of the optical imaging system in Embodiment 2, representing amounts of distortion corresponding to different image heights. FIG. 4D illustrates a lateral color curve of the optical imaging system in Embodiment 2, representing deviations of different image heights on the image plane after light passes through the lens assembly. It can be seen from FIGS. 4A to 4D that the optical imaging system given in Embodiment 2 can achieve a good imaging quality.

Embodiment 3

Figure 5:
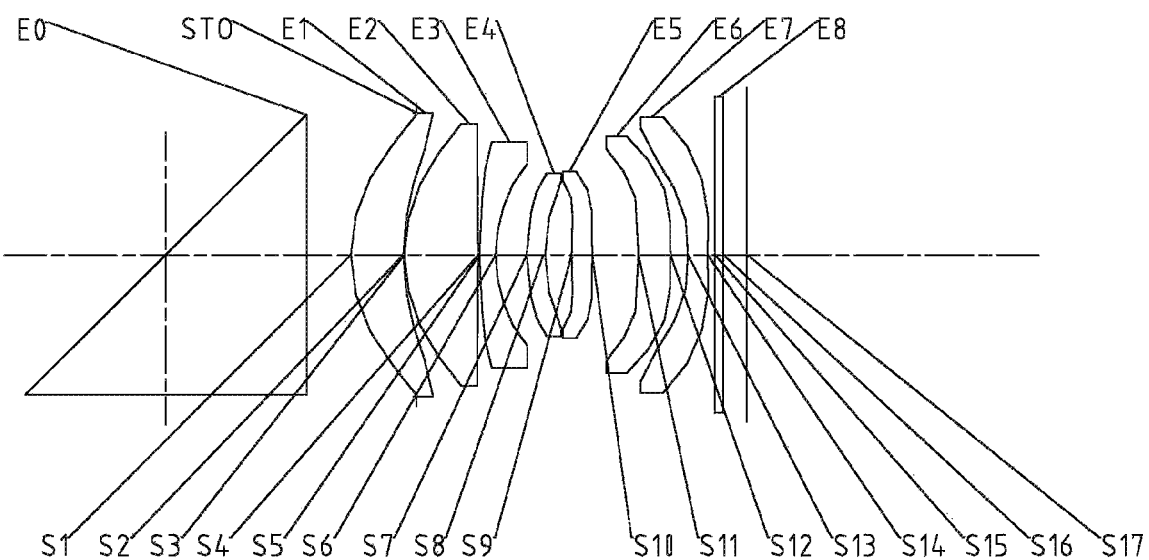
FIG. 5 is a schematic structural diagram of an optical imaging system according to Embodiment 3 of the present disclosure.

An optical imaging system according to Embodiment 3 of the present disclosure is described below with reference to FIGS. 5 to 6D. FIG. 5 is a schematic structural diagram of the optical imaging system according to Embodiment 3 of the present disclosure.

As shown in FIG. 5, the optical imaging system includes, sequentially from an object side to an image side, a prism E0, a stop STO, a first lens E1, a second lens E2, a third lens E3, a fourth lens E4, a fifth lens E5, a sixth lens E6, a seventh lens E7, an optical filter E8 and an image plane S17.

The prism E0 has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism E0 to the image-side surface S16 of the optical filter E8, and finally forms an image on the image plane S17.

In this embodiment, a total effective focal length f of the optical imaging system is 9.29 mm, and a distance TTL from the object-side surface S1 of the first lens E1 to the image plane S17 of the optical imaging system on an optical axis is 9.99 mm. Half of a diagonal length ImgH of an effective pixel area on the image plane S17 of the optical imaging system is 4.20 mm. Half of a maximal field-of-view Semi-FOV of the optical imaging system is 23.91°. A ratio the total effective focal length f of the optical imaging system to an entrance pupil diameter EPD of the optical imaging system f/EPD is 1.30.

Table 5 is a table showing basic parameters of the optical imaging system in Embodiment 3. Here, the units of a radius of curvature, a thickness/distance and a focal length are millimeters (mm). Tables 4-1 and 4-2 show the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| | spherical | infinite | 3.4000 | 1.91 | 31.32 | | |
| | spherical | infinite | 3.4000 | 1.91 | 31.32 | | |
| | spherical | infinite | 2.3932 | | | | |
| STO | spherical | infinite | −1.6392 | | | | |
| S1 | aspheric | 4.0826 | 1.3229 | 1.55 | 55.82 | 18.86 | −0.3639 |
| S2 | aspheric | 5.9910 | 0.0242 | | | | 0.0268 |
| S3 | aspheric | 3.9703 | 1.8670 | 1.55 | 55.82 | 7.52 | 0.0295 |
| S4 | aspheric | 99.2145 | 0.0259 | | | | 83.5146 |
| S5 | aspheric | 9.2887 | 0.4075 | 1.68 | 19.24 | −8.81 | 3.2409 |
| S6 | aspheric | 3.5706 | 0.7861 | | | | 0.0436 |
| S7 | aspheric | 4.8693 | 0.4652 | 1.55 | 55.82 | −62.55 | −0.3254 |
| S8 | aspheric | 4.1178 | 0.6662 | | | | 0.1584 |
| S9 | aspheric | 10.3294 | 0.5200 | 1.68 | 19.24 | 22.68 | −86.1637 |
| S10 | aspheric | 30.8681 | 1.1678 | | | | −66.6725 |
| S11 | aspheric | −2633.7478 | 0.8061 | 1.68 | 19.24 | −261.30 | 39.0000 |
| S12 | aspheric | 189.8207 | 0.4395 | | | | 11.4887 |
| S13 | aspheric | −23.2752 | 0.5000 | 1.55 | 55.82 | −11.77 | 46.3954 |
| S14 | aspheric | 8.9452 | 0.1832 | | | | 0.6375 |
| S15 | spherical | infinite | 0.2100 | 1.52 | 64.17 | | |
| S16 | spherical | infinite | 0.5984 | | | | |
| S17 | spherical | infinite | infinite | | | | |

TABLE 6-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −9.6287E−02 | −9.7009E−02 | −3.2382E−02 | −5.3255E−03 | 1.9452E−03 | 1.4721E−03 | 4.0384E−04 |
| S2 | −4.1516E−01 | −6.0846E−02 | −2.0961E−02 | 7.7029E−03 | 2.7187E−03 | −1.5329E−03 | 1.5423E−04 |
| S3 | −3.6149E−01 | −6.3532E−02 | −4.8369E−02 | −7.6789E−03 | 2.8083E−03 | 1.9327E−03 | 2.5115E−03 |
| S4 | −9.3380E−02 | 1.3266E−02 | −2.5247E−02 | 1.0982E−02 | 7.1970E−04 | 2.0708E−03 | 1.3476E−04 |
| S5 | −2.6359E−01 | 9.1262E−02 | −8.8218E−03 | 6.7549E−03 | 7.4321E−04 | 1.1619E−03 | 1.5024E−04 |
| S6 | −8.1326E−02 | 3.3244E−02 | 2.2404E−03 | −1.8070E−03 | −8.6838E−04 | −1.5927E−05 | 1.3394E−04 |
| S7 | −5.0839E−03 | 3.4114E−02 | 6.5981E−03 | 1.8470E−03 | 1.9595E−04 | 1.5784E−04 | 7.9361E−05 |
| S8 | −7.1720E−02 | 1.7220E−02 | 1.4201E−03 | 8.4441E−04 | 5.2498E−05 | 3.6364E−05 | 2.1016E−06 |
| S9 | −2.9266E−01 | −3.3103E−02 | −2.4782E−03 | −1.1528E−04 | 1.1127E−04 | 4.4388E−05 | 1.2648E−05 |
| S10 | −4.9447E−01 | −1.4034E−02 | 7.9702E−03 | 5.2885E−03 | 2.4555E−03 | 1.3440E−03 | 6.8648E−04 |
| S11 | −9.8637E−01 | 9.0453E−02 | 5.3069E−02 | 1.0692E−02 | 7.3037E−04 | −4.3876E−04 | −3.0338E−03 |
| S12 | −1.3118E+00 | 1.4244E−01 | 1.9862E−03 | 6.1491E−03 | 2.9022E−03 | 6.5677E−03 | 3.6105E−03 |
| S13 | −1.2808E+00 | 5.1790E−01 | −1.0806E−01 | 4.5966E−02 | −2.4213E−02 | −1.8858E−03 | −2.3235E−03 |
| S14 | −2.2017E+00 | 3.4855E−01 | −9.0382E−02 | 7.6561E−02 | −1.7274E−02 | −1.2769E−03 | −6.6114E−03 |

TABLE 6-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 8.1081E−06 | −4.3339E−05 | −7.1086E−06 | −2.9530E−06 | 0.0000E+00 | 0.0000E+00 | 0.0000E+00 |
| S2 | −3.0531E−04 | 8.7921E−05 | −1.1625E−04 | 5.6742E−06 | 0.0000E+00 | 0.0000E+00 | 0.0000E+00 |
| S3 | 1.0731E−03 | 6.2696E−04 | 9.5843E−05 | 1.9219E−05 | 0.0000E+00 | 0.0000E+00 | 0.0000E+00 |
| S4 | 2.4323E−04 | 8.4293E−05 | 7.2349E−05 | 1.4446E−05 | 0.0000E+00 | 0.0000E+00 | 0.0000E+00 |

TABLE 6-2-continued

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S5 | 5.3920E−06 | −1.4126E−05 | 0.0000E+00 | 0.0000E+00 | 0.0000E+00 | 0.0000E+00 | 0.0000E+00 |
| S6 | 6.7111E−05 | 1.7894E−05 | 0.0000E+00 | 0.0000E+00 | 0.0000E+00 | 0.0000E+00 | 0.0000E+00 |
| S7 | 3.7867E−05 | 2.2875E−05 | 8.4603E−06 | 6.2920E−06 | 0.0000E+00 | 0.0000E+00 | 0.0000E+00 |
| S8 | 2.6472E−06 | −7.2269E−07 | 5.5925E−07 | 1.8515E−08 | 0.0000E+00 | 0.0000E+00 | 0.0000E+00 |
| S9 | 5.4314E−06 | −1.3695E−06 | 6.2462E−07 | −8.4054E−07 | 8.8313E−08 | 0.0000E+00 | 0.0000E+00 |
| S10 | 3.6263E−04 | 1.7536E−04 | 8.4999E−05 | 3.2196E−05 | 1.0919E−05 | 0.0000E+00 | 0.0000E+00 |
| S11 | −3.1609E−03 | −1.4243E−03 | −7.8555E−05 | 2.5342E−04 | 1.2207E−04 | 2.6664E−05 | −8.1307E−06 |
| S12 | 1.1523E−03 | −4.2687E−06 | 2.5829E−04 | 2.5978E−04 | 5.3429E−05 | −2.3159E−05 | −2.8273E−05 |
| S13 | −1.4763E−03 | −1.4840E−03 | −3.2609E−04 | −6.4312E−04 | −3.7942E−04 | −1.1557E−04 | 1.4581E−06 |
| S14 | −2.4305E−03 | −1.9693E−03 | −3.7856E−04 | −4.0070E−04 | −1.0254E−04 | −8.2914E−05 | −2.4013E−05 |

Figures 6A, 6B:
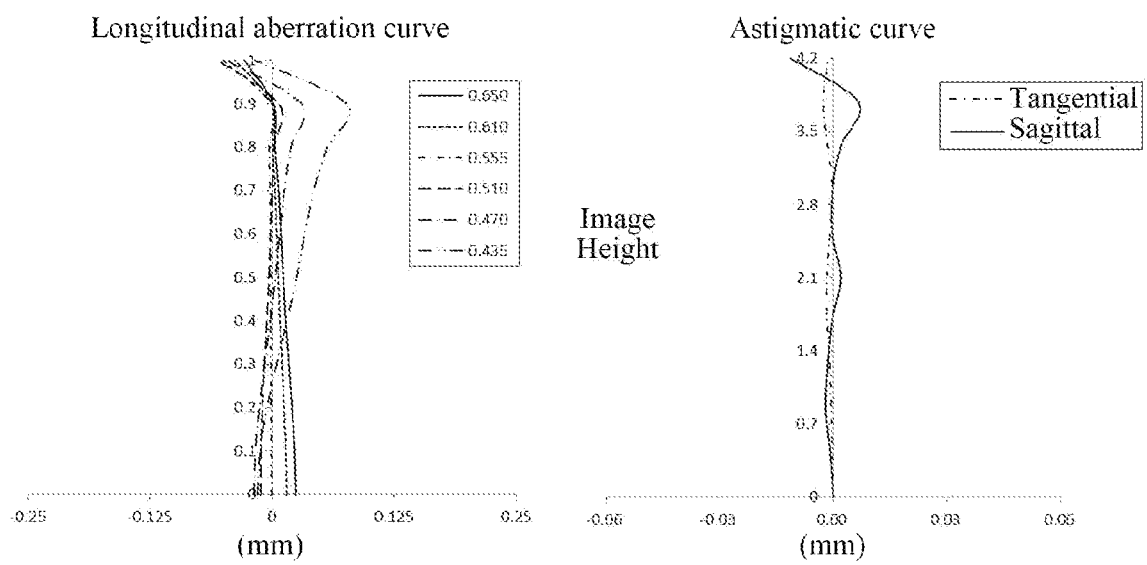
FIGS. 6A to 6D respectively show a longitudinal aberration curve, an astigmatic curve, a distortion curve and a lateral color curve of the optical imaging system according to Embodiment 3 of the present disclosure.
Figure 6C:
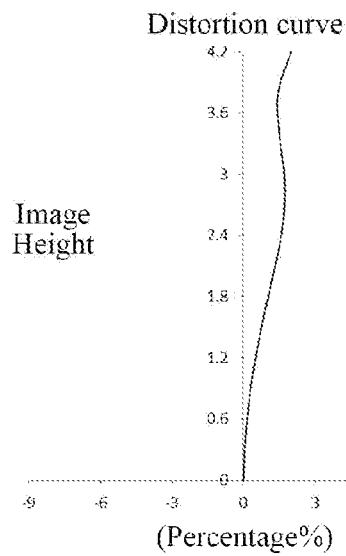
Figure 6D:
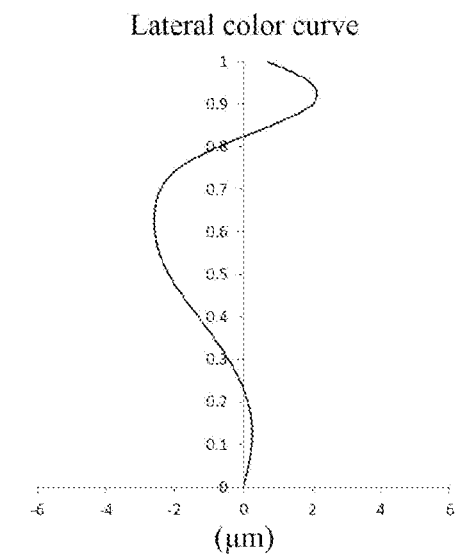

FIG. 6A illustrates a longitudinal aberration curve of the optical imaging system in Embodiment 3, representing deviations of focal points of light of different wavelengths converged after passing through a lens assembly. FIG. 6B illustrates an astigmatic curve of the optical imaging system in Embodiment 3, representing a curvature of a tangential image plane and a curvature of a sagittal image plane. FIG. 6C illustrates a distortion curve of the optical imaging system in Embodiment 3, representing amounts of distortion corresponding to different image heights. FIG. 6D illustrates a lateral color curve of the optical imaging system in Embodiment 3, representing deviations of different image heights on the image plane after light passes through the lens assembly. It can be seen from FIGS. 6A to 6D that the optical imaging system given in Embodiment 3 can achieve a good imaging quality.

Embodiment 4

Figure 7:
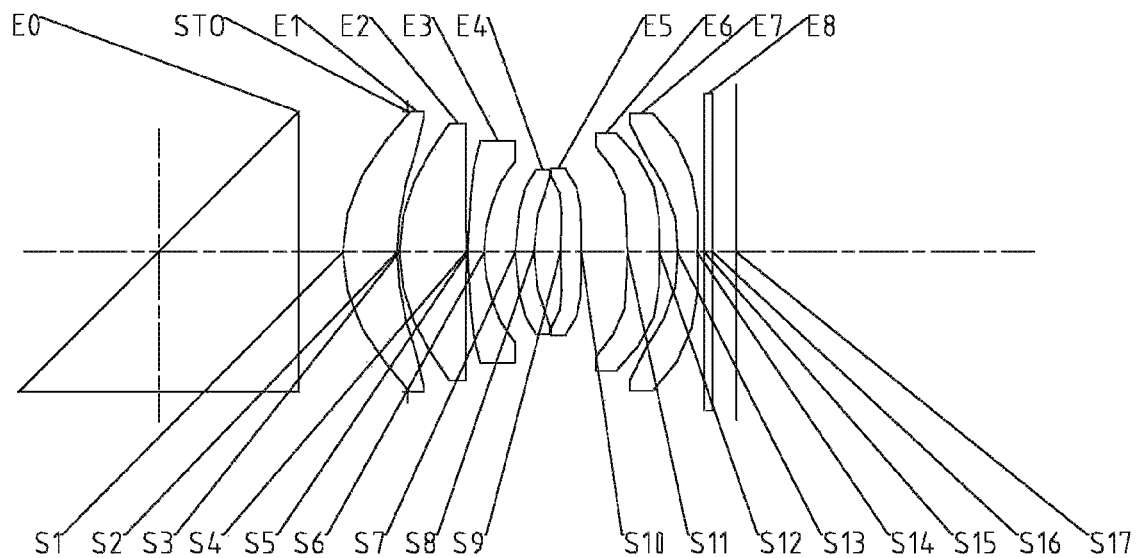
FIG. 7 is a schematic structural diagram of an optical imaging system according to Embodiment 4 of the present disclosure.

An optical imaging system according to Embodiment 4 of the present disclosure is described below with reference to FIGS. 7 to 8D. FIG. 7 is a schematic structural diagram of the optical imaging system according to Embodiment 4 of the present disclosure.

As shown in FIG. 7, the optical imaging system includes, sequentially from an object side to an image side, a prism E0, a stop STO, a first lens E1, a second lens E2, a third lens E3, a fourth lens E4, a fifth lens E5, a sixth lens E6, a seventh lens E7, an optical filter E8 and an image plane S17.

The prism E0 has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S5 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism E0 to the image-side surface S16 of the optical filter E8, and finally forms an image on the image plane S17.

In this embodiment, a total effective focal length f of the optical imaging system is 9.16 mm, and a distance TTL from the object-side surface S1 of the first lens E1 to the image plane S17 of the optical imaging system on an optical axis is 9.97 mm. Half of a diagonal length ImgH of an effective pixel area on the image plane S17 of the optical imaging system is 4.20 mm. Half of a maximal field-of-view Semi-FOV of the optical imaging system is 24.18°. A ratio the total effective focal length f of the optical imaging system to an entrance pupil diameter EPD of the optical imaging system f/EPD is 1.30.

Table 7 is a table showing basic parameters of the optical imaging system in Embodiment 4. Here, the units of a radius of curvature, a thickness/distance and a focal length are millimeters (mm). Tables 8-1 and 8-2 show the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | Thickness/ distance | material refractive index | material abbe number | focal length | conic coefficient |
|---|---|---|---|---|---|---|---|
| OBJ | spherical | infinite | infinite | | | | |
| | spherical | infinite | 3.4000 | 1.91 | 31.32 | | |
| | spherical | infinite | 3.4000 | 1.91 | 31.32 | | |
| | spherical | infinite | 2.3932 | | | | |
| STO | spherical | infinite | −1.6392 | | | | |
| S1 | aspheric | 4.0212 | 1.3756 | 1.55 | 55.82 | 17.21 | −0.3625 |
| S2 | aspheric | 6.1816 | 0.0572 | | | | 0.0186 |

TABLE 7-continued

| surface number | surface type | radius of curvature | Thickness/ distance | material refractive index | abbe number | focal length | conic coefficient |
|---|---|---|---|---|---|---|---|
| S3 | aspheric | 4.1220 | 1.7000 | 1.55 | 55.82 | 7.95 | 0.0222 |
| S4 | aspheric | 70.4239 | 0.0331 | | | | 58.5479 |
| S5 | aspheric | 3.9232 | 0.4141 | 1.68 | 19.24 | −9.15 | 3.2442 |
| S6 | aspheric | 3.5893 | 0.7881 | | | | 0.0312 |
| S7 | aspheric | 4.8693 | 0.4733 | 1.55 | 55.82 | −62.86 | −0.2662 |
| S8 | aspheric | 4.1178 | 0.6778 | | | | 0.0990 |
| S9 | aspheric | 10.1319 | 0.5251 | 1.68 | 19.24 | 20.66 | −78.0307 |
| S10 | aspheric | 35.9048 | 1.1732 | | | | −40.5204 |
| S11 | aspheric | −3119.9179 | 0.8108 | 1.68 | 19.24 | −261.84 | 39.0000 |
| S12 | aspheric | 188.1246 | 0.4531 | | | | 90.0000 |
| S13 | aspheric | −23.3071 | 0.5011 | 1.55 | 55.82 | −11.56 | 46.3954 |
| S14 | aspheric | 8.7199 | 0.1810 | | | | 0.4804 |
| S15 | spherical | infinite | 0.2100 | 1.52 | 64.17 | | |
| S16 | spherical | infinite | 0.5963 | | | | |
| S17 | spherical | infinite | infinite | | | | |

TABLE 8-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −9.5192E−02 | −9.6471E−02 | −3.3516E−02 | −5.7642E−03 | 1.9023E−03 | 1.5574E−03 | 5.4623E−04 |
| S2 | −4.1668E−01 | −6.0176E−02 | −2.0325E−02 | 7.2515E−03 | 2.1160E−03 | −1.7777E−03 | 1.9545E−04 |
| S3 | −3.6688E−01 | −6.5753E−02 | −4.8606E−02 | −6.9235E−03 | 3.3017E−03 | 2.0147E−03 | 2.5334E−03 |
| S4 | −9.3250E−02 | 1.1438E−02 | −2.8376E−02 | 1.0863E−02 | 1.4312E−03 | 2.9364E−03 | 4.5702E−04 |
| S5 | −2.6343E−01 | 9.0730E−02 | −7.9491E−03 | 6.6148E−03 | 4.8670E−04 | 1.3895E−03 | 1.8664E−04 |
| S6 | −8.2934E−02 | 3.2661E−02 | 2.6476E−03 | −1.7329E−03 | −9.9461E−04 | −1.3874E−04 | 4.5849E−05 |
| S7 | −3.5536E−03 | 3.5126E−02 | 6.4638E−03 | 1.8624E−03 | 2.1134E−04 | 1.6892E−04 | 5.5119E−05 |
| S8 | −7.3376E−02 | 1.6938E−02 | 1.3045E−02 | 7.8512E−04 | 2.8449E−05 | 4.4584E−05 | −1.7905E−06 |
| S9 | −2.8993E−01 | −3.2985E−02 | −2.5008E−03 | 1.9882E−04 | 1.0597E−04 | 1.2407E−04 | 4.1018E−06 |
| S10 | −4.9278E−01 | −1.3557E−02 | 8.8657E−03 | 5.9615E−03 | 2.5499E−03 | 1.3949E−03 | 6.0119E−04 |
| S11 | −9.9066E−01 | 9.0574E−02 | 5.2186E−02 | 1.0330E−02 | 1.2156E−03 | −3.9245E−04 | −3.2453E−03 |
| S12 | −1.2987E+00 | 1.4339E−01 | 1.0156E−02 | 6.2191E−03 | 3.4680E−03 | 6.7776E−03 | 3.4210E−03 |
| S13 | −1.2796E+00 | 5.1662E−01 | −1.0798E−01 | 4.6499E−02 | −2.4002E−02 | −1.4587E−03 | −2.0664E−03 |
| S14 | −2.2069E+00 | 3.4192E−01 | −8.8863E−02 | 7.4220E−02 | −1.7340E−02 | −1.5623E−03 | −6.1432E−03 |

TABLE 8-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.2443E−04 | 2.5162E−05 | −5.9412E−07 | −1.1623E−05 | 0.0000E+00 | 0.0000E+00 | 0.0000E+00 |
| S2 | −2.7611E−04 | 1.5374E−06 | −1.2353E−04 | 4.0299E−05 | 0.0000E+00 | 0.0000E+00 | 0.0000E+00 |
| S3 | 1.0662E−03 | 5.0038E−04 | 3.0616E−05 | 2.2205E−05 | 0.0000E+00 | 0.0000E+00 | 0.0000E+00 |
| S4 | 4.7137E−04 | 8.2172E−05 | 6.7759E−05 | −1.5479E−06 | 0.0000E+00 | 0.0000E+00 | 0.0000E+00 |
| S5 | 1.5283E−04 | 1.6874E−05 | 0.0000E+00 | 0.0000E+00 | 0.0000E+00 | 0.0000E+00 | 0.0000E+00 |
| S6 | 3.9222E−05 | 2.9253E−05 | 0.0000E+00 | 0.0000E+00 | 0.0000E+00 | 0.0000E+00 | 0.0000E+00 |
| S7 | 3.1600E−05 | 1.1888E−05 | 7.3528E−06 | 1.3328E−06 | 0.0000E+00 | 0.0000E+00 | 0.0000E+00 |
| S8 | 7.2420E−06 | −2.1888E−06 | 1.3221E−06 | −6.1819E−07 | 0.0000E+00 | 0.0000E+00 | 0.0000E+00 |
| S9 | 2.6871E−05 | −9.3455E−06 | 5.3454E−06 | −5.9246E−06 | 1.7802E−06 | 0.0000E+00 | 0.0000E+00 |
| S10 | 3.1000E−04 | 1.1470E−04 | 6.2122E−05 | 1.7111E−05 | 1.0839E−05 | 0.0000E+00 | 0.0000E+00 |
| S11 | −3.2652E−03 | −1.3098E−03 | 3.9902E−05 | 3.4848E−04 | 1.6010E−04 | 4.6303E−05 | −4.6151E−06 |
| S12 | 9.1058E−04 | −3.0331E−05 | 1.6025E−04 | 2.6104E−04 | 7.5460E−05 | −9.1884E−06 | −3.6576E−05 |
| S13 | −1.4771E−03 | −1.4617E−03 | −5.0143E−04 | −4.9974E−04 | −3.3440E−04 | −2.0934E−04 | −2.0569E−05 |
| S14 | −2.3168E−03 | −1.6619E−03 | −5.4276E−04 | −4.5941E−04 | −1.4875E−04 | −1.0622E−04 | −1.1046E−05 |

Figure 8A:
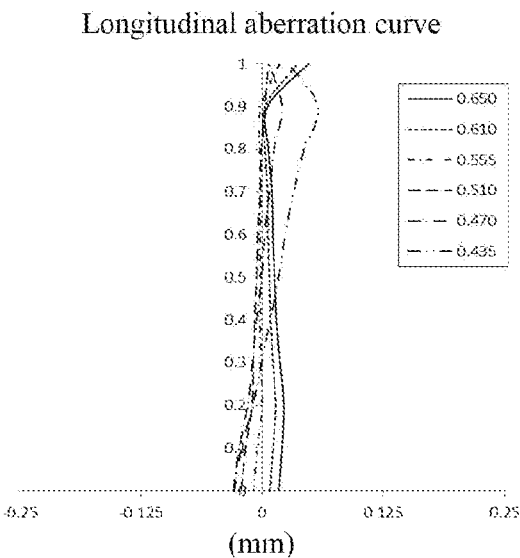
FIGS. 8A to 8D respectively show a longitudinal aberration curve, an astigmatic curve, a distortion curve and a lateral color curve of the optical imaging system according to Embodiment 4 of the present disclosure.
Figure 8B:
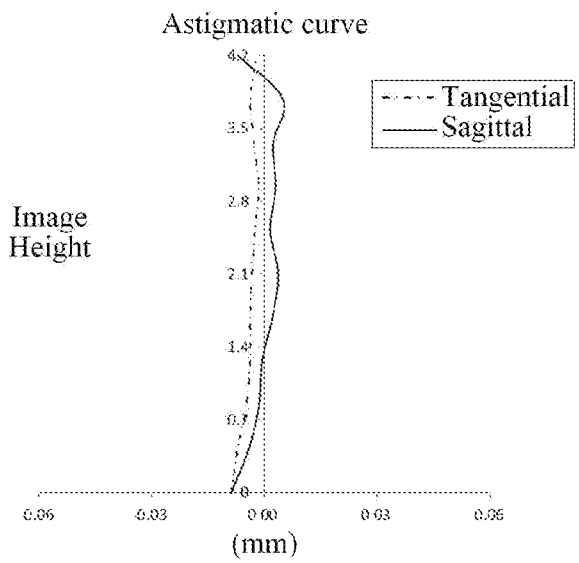
Figure 8C:
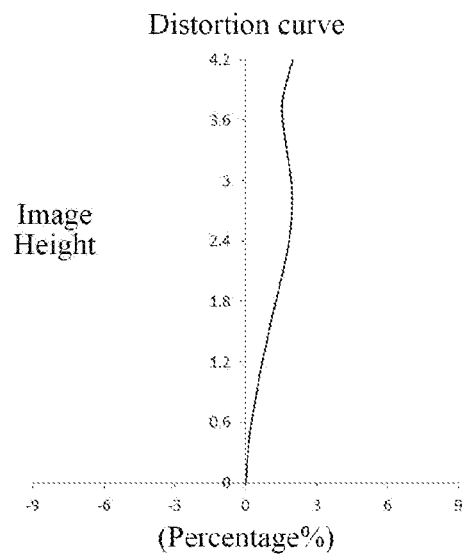
Figure 8D:
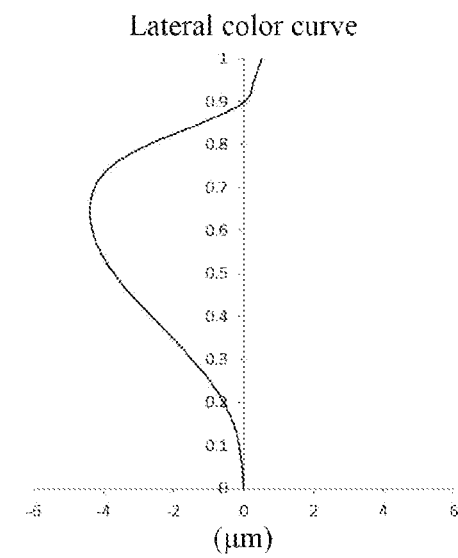

FIG. 8A illustrates a longitudinal aberration curve of the optical imaging system in Embodiment 4, representing deviations of focal points of light of different wavelengths converged after passing through a lens assembly. FIG. 8B illustrates an astigmatic curve of the optical imaging system in Embodiment 4, representing a curvature of a tangential image plane and a cup/attire of a sagittal image plane. FIG. 8C illustrates a distortion curve of the optical imaging system in Embodiment 4, representing amounts of distortion corresponding to different image heights. FIG. 8D illustrates a lateral color curve of the optical imaging system in Embodiment 4, representing deviations of different image heights on the image plane after light passes through the lens assembly. It can be seen from FIGS. 8A to 8D that the optical imaging system given in Embodiment 4 can achieve a good imaging quality.

Embodiment 5

Figure 9:
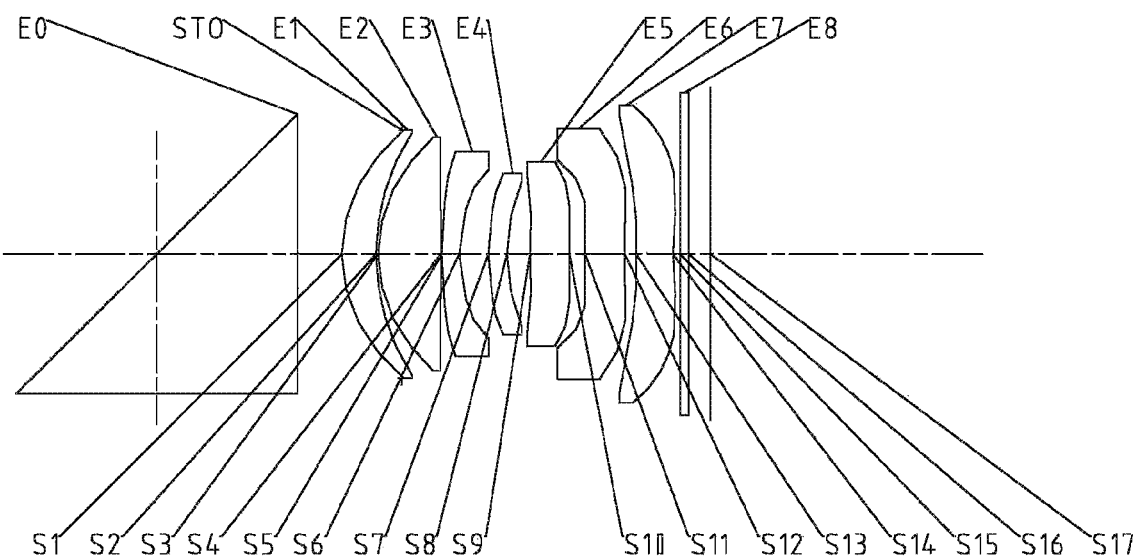
FIG. 9 is a schematic structural diagram of an optical imaging system according to Embodiment 5 of the present disclosure.

An optical imaging system according to Embodiment 5 of the present disclosure is described below with reference to FIGS. 9 to 10D. FIG. 9 is a schematic structural diagram of the optical imaging system according to Embodiment 5 of the present disclosure.

As shown in FIG. 9, the optical imaging system includes, sequentially from an object side to an image side, a prism E0, a stop STO, a first lens E1, a second lens E2, a third lens E3, a fourth lens E4, a fifth lens E5, a sixth lens E6, a seventh lens E7, an optical filter E8 and an image plane S17.

The prism E0 has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces from the light incident surface of the prism E0 to the image-side surface S16 of the optical filter E8, and finally forms an image on the image plane S17.

In this embodiment, a total effective focal length f of the optical imaging system is 8.11 mm, and a distance TTL from the object-side surface S1 of the first lens E1 to the image plane S17 of the optical imaging system on an optical axis is 9.30 mm. Half of a diagonal length ImgH of an effective pixel area on the image plane S17 of the optical imaging system is 4.20 mm. Half of a maximal field-of-view Semi-FOV of the optical imaging system is 27.23°. A ratio the total effective focal length f of the optical imaging system to an entrance pupil diameter EPD of the optical imaging system f/EPD is 1.30.

Table 9 is a table showing basic parameters of the optical imaging system in Embodiment 5. Here, the units of a radius of curvature, a thickness/distance and a focal length are millimeters (mm). Tables 10-1 and 10-2 show the high-order coefficients applicable to the aspheric surfaces in Embodiment 5. Here, the surface type of each aspheric surface may be defined using the formula (1) given in Embodiment 1.

TABLE 9

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| | spherical | infinite | 3.4000 | 1.91 | 31.32 | | |
| | spherical | infinite | 3.4000 | 1.91 | 31.32 | | |
| | spherical | infinite | 2.3932 | | | | |
| STO | spherical | infinite | −1.6392 | | | | |
| S1 | aspheric | 3.7522 | 0.8608 | 1.55 | 55.82 | 20.75 | −0.3199 |
| S2 | aspheric | 5.1557 | 0.0559 | | | | 0.2584 |
| S3 | aspheric | 3.5224 | 1.5861 | 1.55 | 55.82 | 6.68 | −0.0135 |
| S4 | aspheric | 87.1539 | 0.0200 | | | | 0.0000 |
| S5 | aspheric | 8.3229 | 0.4400 | 1.68 | 19.24 | −9.80 | 4.4206 |
| S6 | aspheric | 3.6135 | 0.7336 | | | | 0.2629 |
| S7 | aspheric | 4.8693 | 0.4733 | 1.55 | 55.82 | −62.73 | −4.0659 |
| S8 | aspheric | 4.1178 | 0.5807 | | | | −0.5734 |
| S9 | aspheric | 15.9097 | 0.9961 | 1.68 | 19.24 | 52.92 | 0.0000 |
| S10 | aspheric | 27.8751 | 0.3976 | | | | 0.0000 |
| S11 | aspheric | 16.2456 | 1.0000 | 1.68 | 19.24 | −162.41 | 39.0000 |
| S12 | aspheric | 13.8038 | 0.2869 | | | | 15.5526 |
| S13 | aspheric | 25.2323 | 0.9260 | 1.55 | 55.82 | −14.29 | 46.3954 |
| S14 | aspheric | 5.8816 | 0.2203 | | | | −0.9908 |
| S15 | spherical | infinite | 0.2100 | 1.52 | 64.17 | | |
| S16 | spherical | infinite | 0.6344 | | | | |
| S17 | spherical | infinite | infinite | | | | |

TABLE 10-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 4.5083E−02 | −4.0288E−03 | −8.5255E−03 | −6.5420E−03 | −1.6855E−03 | −2.1075E−05 | 2.6846E−04 |
| S2 | −1.4361E−01 | 3.0527E−02 | −1.8555E−02 | −5.9953E−03 | 2.4382E−03 | −9.8866E−05 | 7.3184E−04 |
| S3 | −1.6520E−01 | −1.9431E−03 | −2.8485E−02 | −1.0918E−02 | 8.2999E−04 | −2.0261E−04 | 6.8225E−04 |
| S4 | −5.4089E−02 | 3.9545E−03 | −1.1765E−02 | 1.8283E−03 | −8.2172E−04 | 2.5192E−04 | −6.5523E−05 |

TABLE 10-1-continued

| surface number | $A_4$ | $A_6$ | $A_8$ | $A_{10}$ | $A_{12}$ | $A_{14}$ | $A_{16}$ |
|---|---|---|---|---|---|---|---|
| S5 | −1.9453E−01 | 6.3528E−02 | −6.8971E−03 | 3.8353E−03 | −1.0422E−03 | 1.7471E−04 | −3.1061E−05 |
| S6 | −6.4256E−02 | 5.3963E−02 | 7.9152E−03 | 3.4590E−03 | 2.3682E−04 | 1.0818E−05 | −2.9708E−05 |
| S7 | −6.7171E−02 | 3.9967E−02 | 6.9224E−03 | 1.0321E−03 | −6.1669E−05 | 5.4403E−06 | −1.4441E−06 |
| S8 | −9.1095E−02 | 2.5552E−02 | 4.2842E−03 | 1.2907E−03 | 1.7448E−04 | 1.1592E−04 | 3.3082E−06 |
| S9 | −1.6115E−01 | −8.9734E−03 | −1.6569E−03 | 1.3099E−04 | −1.1161E−04 | 4.8763E−05 | −2.9595E−05 |
| S10 | −4.3081E−01 | −1.1238E−02 | 3.6314E−04 | 1.2650E−03 | 6.9595E−04 | 4.4087E−04 | 3.0296E−04 |
| S11 | −8.8490E−01 | −5.4616E−02 | 1.3621E−02 | 6.9430E−03 | 3.2143E−03 | 1.4291E−03 | 7.2906E−04 |
| S12 | −1.1709E+00 | 2.1088E−02 | 9.3379E−03 | −5.0226E−03 | −6.1699E−04 | 1.9544E−03 | −5.6310E−04 |
| S13 | −9.8732E−01 | 2.6323E−01 | −9.5516E−02 | 1.8874E−02 | −5.7370E−03 | 1.2495E−03 | −3.6223E−03 |
| S14 | −2.3721E+00 | 2.8194E−01 | −7.7818E−02 | 2.1388E−02 | −4.4508E−03 | 2.4239E−03 | −2.3898E−03 |

TABLE 10-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.7663E−04 | 7.5157E−05 | 1.9832E−05 | −3.6062E−06 | 0.0000E+00 | 0.0000E+00 | 0.0000E+00 |
| S2 | −9.9764E−05 | 8.3636E−05 | −4.5199E−05 | 7.0724E−06 | 0.0000E+00 | 0.0000E+00 | 0.0000E+00 |
| S3 | −3.3228E−05 | 5.6163E−05 | −4.3182E−05 | −9.4674E−07 | 0.0000E+00 | 0.0000E+00 | 0.0000E+00 |
| S4 | 4.6113E−05 | −1.5749E−05 | 6.6943E−06 | −3.0004E−06 | 0.0000E+00 | 0.0000E+00 | 0.0000E+00 |
| S5 | 2.5182E−05 | 8.5098E−07 | 0.0000E+00 | 0.0000E+00 | 0.0000E+00 | 0.0000E+00 | 0.0000E+00 |
| S6 | −1.0536E−05 | 5.4178E−06 | 0.0000E+00 | 0.0000E+00 | 0.0000E+00 | 0.0000E+00 | 0.0000E+00 |
| S7 | 5.0612E−06 | −1.0025E−06 | 2.4970E−06 | 1.3124E−06 | 0.0000E+00 | 0.0000E+00 | 0.0000E+00 |
| S8 | 2.6456E−05 | −4.5300E−06 | 7.1686E−06 | −4.9391E−06 | 0.0000E+00 | 0.0000E+00 | 0.0000E+00 |
| S9 | 1.6539E−05 | −1.2907E−05 | 7.2744E−06 | −2.0306E−06 | 2.0053E−07 | 0.0000E+00 | 0.0000E+00 |
| S10 | 1.2674E−04 | 8.2605E−05 | 1.8243E−05 | 9.4528E−06 | −1.0749E−05 | 1.8974E−07 | 0.0000E+00 |
| S11 | 2.0337E−04 | 8.0321E−05 | −1.2867E−05 | −2.1130E−05 | −4.9805E−05 | −3.6665E−05 | −1.7213E−05 |
| S12 | −4.7855E−04 | 1.4661E−04 | 2.3675E−04 | −3.0029E−05 | −1.3212E−04 | −7.2340E−05 | −2.8560E−05 |
| S13 | −4.4301E−04 | 4.9533E−04 | −2.2406E−04 | −2.6427E−04 | 9.2588E−06 | −7.0776E−06 | −7.1145E−05 |
| S14 | −1.2735E−03 | −1.7905E−03 | −7.1886E−04 | −2.7792E−04 | 4.5754E−05 | 5.6456E−05 | 1.1416E−04 |

Figure 10A:
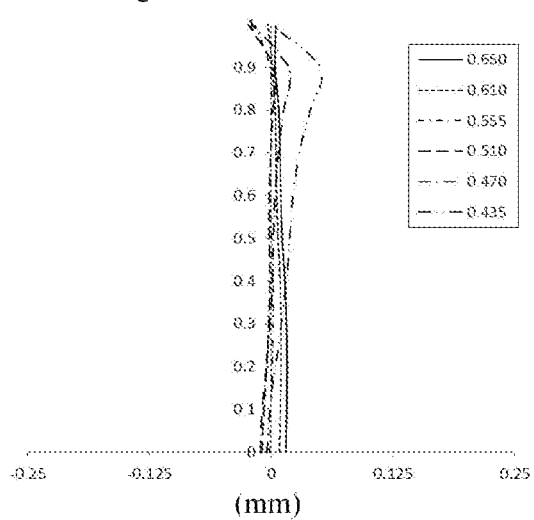
FIGS. 10A to 10D respectively show a longitudinal aberration curve, an astigmatic curve, a distortion curve and a lateral color curve of the optical imaging system according to Embodiment 5 of the present disclosure.
Figure 10B:
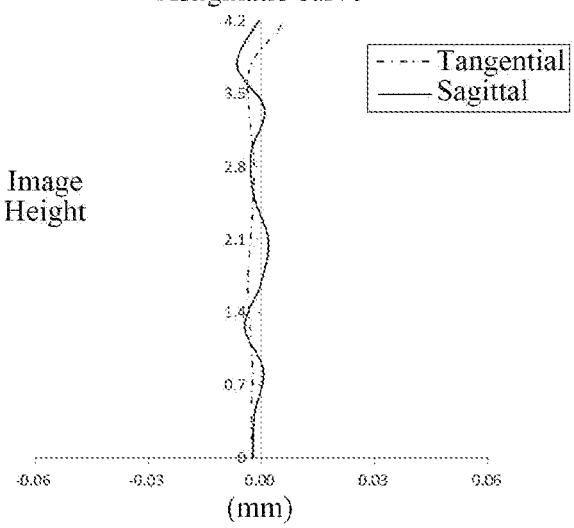
Figure 10C:
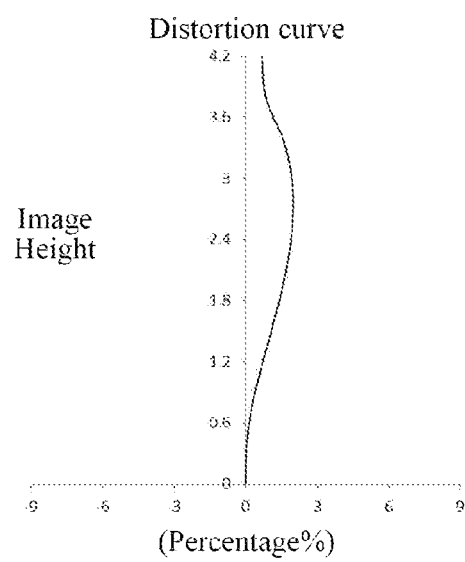
Figure 10D:
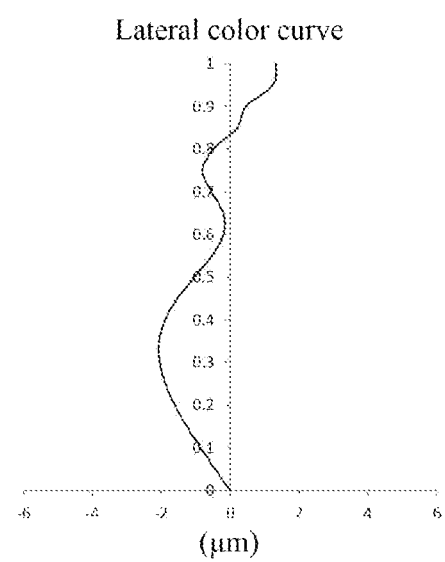

FIG. 10A illustrates a longitudinal aberration curve of the optical imaging system in Embodiment 5, representing deviations of focal points of light of different wavelengths converged after passing through a lens assembly, FIG. 10B illustrates an astigmatic curve of the optical imaging system in Embodiment 5, representing a curvature of a tangential image plane and a curvature of a sagittal image plane. FIG. 10C illustrates a distortion curve of the optical imaging system in Embodiment 5, representing amounts of distortion corresponding to different image heights. FIG. 10D illustrates a lateral color curve of the optical imaging system in Embodiment 5, representing deviations of different image heights on the image plane after light passes through the lens assembly. It can be seen from FIGS. 10A to 10D that the optical imaging system given in Embodiment 5 can achieve a good imaging quality.

In summary, Embodiments 1 to 5 respectively satisfy the relationships shown in Table 11.

TABLE 11

| conditional expression | embodiment | | | | |
|---|---|---|---|---|---|
| | 1 | 2 | 3 | 4 | 5 |
| TTL/f | 1.05 | 1.12 | 1.08 | 1.09 | 1.15 |
| (f1 + f7)/f3 | −0.70 | −1.22 | −0.80 | −0.62 | −0.66 |
| f2/f | 0.80 | 0.86 | 0.81 | 0.87 | 0.82 |
| CT1/CT2 | 0.64 | 0.64 | 0.71 | 0.81 | 0.54 |
| R3/(R1 + R2) | 0.39 | 0.38 | 0.39 | 0.40 | 0.40 |
| (CT4 + CT5)/T45 | 1.47 | 1.57 | 1.48 | 1.47 | 2.53 |
| (R7 + R8)/f | 0.95 | 1.06 | 0.97 | 0.98 | 1.11 |

Embodiments of the present disclosure further provide an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system, comprising:
   a prism, reflecting light incident to the prism along a first direction, to cause the light to emerge from the prism along a second direction; and
   the optical imaging system further comprising, sequentially from the prism to an image side along the second direction: a stop, a first lens, a second lens, a third lens, a fourth lens, a fifth lens, a sixth lens, and a seventh lens,
   wherein each of the first lens to the seventh lens has a refractive power; and a total effective focal length f of the optical imaging system and an entrance pupil diameter EPD of the optical imaging system satisfy: f/EPD<1.4, wherein the second lens has a positive refractive power;

an object-side surface of the fourth lens is a convex surface, an image-side surface of the fourth lens is a concave surface; and an image-side surface of the sixth lens is a concave surface.

2. The optical imaging system according to claim 1, wherein an effective focal length f1 of the first lens, an effective focal length f3 of the third lens, and an effective focal length f7 of the seventh lens satisfy: −1.5<(f1+f7)/f3<0.

3. The optical imaging system according to claim 1, wherein an effective focal length f2 of the second lens and the total effective focal length f of the optical imaging system satisfy: 0.6<f2/f<1.

4. The optical imaging system according to claim 1, wherein a radius of curvature R1 of an object-side surface of the first lens, a radius of curvature R2 of an image-side surface of the first lens, and a radius of curvature R3 of an object-side surface of the second lens satisfy: 0.2<R3/(R1+R2)<0.5.

5. The optical imaging system according to claim 1, wherein a center thickness CT1 of the first lens on an optical axis and a center thickness CT2 of the second lens on the optical axis satisfy: 0.4<CT1/CT2<1.1.

6. The optical imaging system according to claim 1, wherein a center thickness CT4 of the fourth lens on an optical axis, a center thickness CT5 of the fifth lens on the optical axis, and a spacing distance T45 between the fourth lens and the fifth lens on the optical axis satisfy: 1.4<(CT4+CT5)/T45<2.6.

7. The optical imaging system according to claim 1, wherein a radius of curvature R7 of an object-side surface of the fourth lens, a radius of curvature R8 of an image-side surface of the fourth lens, and the total effective focal length f of the optical imaging system satisfy: 0.8<(R7+R8)/f<1.3.

8. The optical imaging system according to claim 1, wherein a distance TTL from an object-side surface of the first lens to an image plane of the optical imaging system on an optical axis and the total effective focal length f of the optical imaging system satisfy: TTL/f≤1.15.

9. The optical imaging system according to claim 1, wherein half of a maximal field-of-view Semi-FOV of the optical imaging system satisfies: 20°<Semi-FOV<30°.

10. An optical imaging system, comprising:

a prism, reflecting light incident to the prism along a first direction, to cause the light to emerge from the prism along a second direction; and the optical imaging system further comprising, sequentially from the prism to an image side along the second direction: a stop, a first lens, a second lens, a third lens, a fourth lens, a fifth lens, a sixth lens, and a seventh lens, wherein the second lens has a positive refractive power;

an object-side surface of the fourth lens is a convex surface, an image-side surface of the fourth lens is a concave surface; and an image-side surface of the sixth lens is a concave surface, wherein a center thickness CT4 of the fourth lens on an optical axis, a center thickness CT5 of the fifth lens on the optical axis, and a spacing distance T45 between the fourth lens and the fifth lens on the optical axis satisfy: 1.4<(CT4+CT5)/T45<2.6.

11. The optical imaging system according to claim 10, wherein an effective focal length f2 of the second lens and a total effective focal length f of the optical imaging system satisfy: 0.6<f2/f<1.

12. The optical imaging system according to claim 10, wherein a radius of curvature R1 of an object-side surface of the first lens, a radius of curvature R2 of an image-side surface of the first lens, and a radius of curvature R3 of an object-side surface of the second lens satisfy: 0.2<R3/(R1+R2)<0.5.

13. The optical imaging system according to claim 10, wherein a center thickness CT1 of the first lens on an optical axis and a center thickness CT2 of the second lens on the optical axis satisfy: 0.4<CT1/CT2<1.1.

14. The optical imaging system according to claim 10, wherein a radius of curvature R7 of the object-side surface of the fourth lens, a radius of curvature R8 of the image-side surface of the fourth lens, and a total effective focal length f of the optical imaging system satisfy: 0.8<(R7+R8)/f<1.3.

15. The optical imaging system according to claim 10, wherein an effective focal length f1 of the first lens, an effective focal length f3 of the third lens, and an effective focal length f7 of the seventh lens satisfy: −1.5<(f1+f7)/f3<0.

16. The optical imaging system according to claim 10, wherein a distance TTL from an object-side surface of the first lens to an image plane of the optical imaging system on an optical axis and a total effective focal length f of the optical imaging system satisfy: TTL/f≤1.15.

17. The optical imaging system according to claim 10, wherein half of a maximal field-of-view Semi-FOV of the optical imaging system satisfies: 20°<Semi-FOV<30°.

18. The optical imaging system according to claim 10, wherein a total effective focal length f of the optical imaging system and an entrance pupil diameter EPD of the optical imaging system satisfy: f/EPD<1.4.

\* \* \* \* \*